United States Patent
Nabata (10) Patent No.: US 9,300,863 B2
(45) Date of Patent: Mar. 29, 2016

(54) ELECTRONIC DEVICE

(75) Inventor: Toshihisa Nabata, Zama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/114,158

(22) PCT Filed: Apr. 26, 2012

(86) PCT No.: PCT/JP2012/061698
§ 371 (c)(1),
(2), (4) Date: Oct. 25, 2013

(87) PCT Pub. No.: WO2012/147997
PCT Pub. Date: Nov. 1, 2012

(65) Prior Publication Data
US 2014/0049679 A1  Feb. 20, 2014

(30) Foreign Application Priority Data
Apr. 26, 2011  (JP) .................................. 2011-098580

(51) Int. Cl.
*H04N 5/222* (2006.01)
*H04N 5/232* (2006.01)
(Continued)

(52) U.S. Cl.
CPC ............ *H04N 5/23216* (2013.01); *G03B 13/18* (2013.01); *G03B 17/18* (2013.01); *H04N 5/23212* (2013.01)

(58) Field of Classification Search
CPC ........... H04N 5/23216; H04N 5/23212; G03B 13/18; G03B 17/18
USPC ....................................... 348/333.12, 333.11
See application file for complete search history.

(56) References Cited

U.S. PATENT DOCUMENTS

2009/0244357 A1* 10/2009 Huang ............... H04N 5/23293
                                                              348/345
2010/0277428 A1* 11/2010 Kumazawa .................. 345/173
(Continued)

FOREIGN PATENT DOCUMENTS

JP          11-164175 A      6/1999
JP          2005-275632 A    10/2005
(Continued)

OTHER PUBLICATIONS

International Search Report; PCT/JP2012/061698; Aug. 14, 2012.
(Continued)

*Primary Examiner* — Sinh Tran
*Assistant Examiner* — Zhenzhen Wu
(74) *Attorney, Agent, or Firm* — Studebaker & Brackett PC (57) ABSTRACT

An imaging unit images a subject. A contact detection unit detects contact or release of contact by a contacting object on an image displayed on a display screen of a display unit. A tactile sensation providing unit provides a tactile sensation to the contacting object in contact with the contact detection unit. A control unit instructs the tactile sensation providing unit to execute a tactile sensation providing operation when a contact area between the contact detection unit and the contacting object is equal to or greater than a standard area. After instructing the tactile sensation providing unit to execute the tactile sensation providing operation, the control unit controls the imaging unit to shorten the focal length if the contact area between the contact detection unit and the contacting object is less than the standard area and to extend the focal length if the contact area is equal to or greater than the standard area.

1 Claim, 8 Drawing Sheets
(5 of 8 Drawing Sheet(s) Filed in Color)

(51) Int. Cl.
*G03B 13/18* (2006.01)
*G03B 17/18* (2006.01)

(56) References Cited

U.S. PATENT DOCUMENTS

| | | | | |
|---|---|---|---|---|
| 2010/0328053 | A1* | 12/2010 | Yeh et al. | 340/407.2 |
| 2011/0061023 | A1* | 3/2011 | Kim | 715/810 |
| 2011/0291970 | A1* | 12/2011 | Liu et al. | 345/173 |
| 2012/0299856 | A1* | 11/2012 | Hasui | 345/173 |

FOREIGN PATENT DOCUMENTS

| | | | |
|---|---|---|---|
| JP | 2008134918 A | * | 6/2008 |
| JP | 2010-044520 A | | 2/2010 |

OTHER PUBLICATIONS

An Office Action; "Notice of Reasons for Rejection," issued by the Japanese Patent Office on Jan. 5, 2016, which corresponds to Japanese Patent Application No. 2011-098580 and is related to U.S. Appl. No. 14/114,158; with English language concise explanation.

* cited by examiner

ELECTRONIC DEVICE

CROSS REFERENCE TO RELATED APPLICATION

This application claims priority to and the benefit of Japanese Patent Application No. 2011-098580 filed on Apr. 26, 2011, the entire contents of which are incorporated herein by reference.

TECHNICAL FIELD

The present invention relates to an electronic device provided with a contact detection unit.

BACKGROUND

In recent years, the image display unit of more and more electronic devices, such as digital cameras, is being provided with a touch panel. Some digital cameras provided with a touch panel execute processing such as autofocus when the touch panel is touched.

For example, with the technique disclosed in JP11-164175A (Patent Literature 1), operational buttons such as a shutter button, zoom-in button, zoom-out button, and the like are displayed in overlap on the photography image, and touching these buttons allows for execution of an autofocus operation, zoom operation, shutter operation, and the like.

CITATION LIST

Patent Literature 1: JP11-164175A

SUMMARY

In a digital camera provided with a touch panel as described above, processing such as autofocus is executed when the touch panel is touched, yet adjustment of the focal length is performed by touching a button or the like, displayed on the touch panel, for adjusting focal length. The display screen is therefore covered in buttons.

Apart from adjustment of the focal length, operations to touch buttons displayed on the display screen are also necessary, for example, in order to expand or reduce the display screen, or to increase or decrease a parameter associated with predetermined processing.

The present invention has been conceived in light of the above problems and provides an electronic device that does not require a button or the like to be provided for increasing or decreasing a parameter associated with predetermined processing.

An electronic device according to the present invention is for adjusting, in accordance with contact area, a parameter associated with predetermined processing and includes a contact detection unit configured to detect contact by a contacting object, and a control unit configured to adjust the parameter based on a contact area between the contact detection unit and the contacting object and on a standard area.

The electronic device according to the present invention may further include an imaging unit configured to image a subject, and by adjusting the parameter based on the contact area and on the standard area, the control unit may control the imaging unit to adjust a focal length.

The electronic device according to the present invention may further include a tactile sensation providing unit configured to provide a tactile sensation to the contacting object in contact with the contact detection unit. The control unit may control the tactile sensation providing unit to provide the tactile sensation to the contacting object when the contact area between the contact detection unit and the contacting object is equal to or greater than the standard area, and after controlling the tactile sensation providing unit to provide the tactile sensation to the contacting object, may shorten the focal length when the contact area between the contact detection unit and the contacting object is less than the standard area and extend the focal length when the contact area between the contact detection unit and the contacting object is equal to or greater than the standard area.

According to the present invention, since the contact area between the contact detection unit and the contacting object is calculated, and a parameter is increased or decreased based on the calculated contact area and the standard area, it is not necessary to provide a button or the like for increasing or decreasing the parameter. Furthermore, according to the present invention, since the contact area between the contact detection unit and the contacting object is calculated, and a parameter is increased or decreased based on the calculated contact area and the standard area, the operator can increase or decrease the parameter intuitively and smoothly.

BRIEF DESCRIPTION OF DRAWINGS

The patent or application file contains at least one drawing executed in color. Copies of this patent or patent application publication with color drawing(s) will be provided by the Office upon request and payment of the necessary fee.

The present invention will be further described below with reference to the accompanying drawings, wherein.

DESCRIPTION OF EMBODIMENTS

Figure 1:
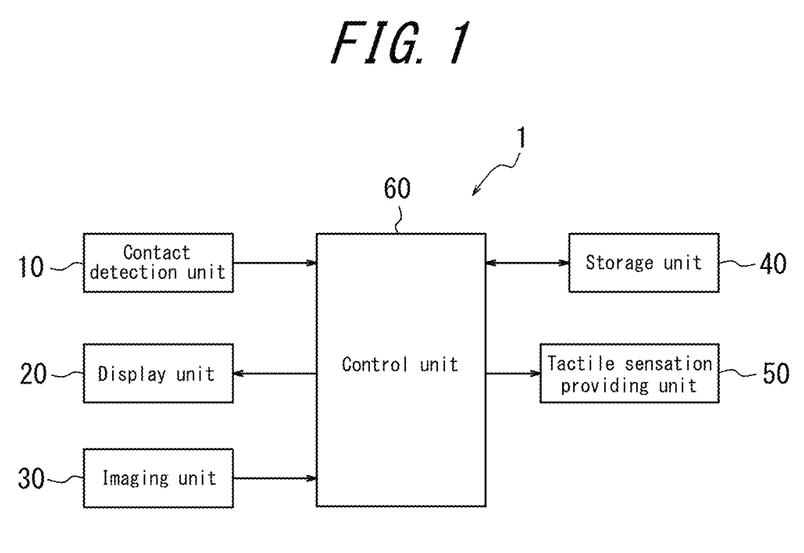
FIG. 1 is a block diagram schematically illustrating the structure of an electronic device according to an embodiment of the present invention.

An embodiment of the present invention is described below with reference to the figures. An electronic device according to the present invention is, for example, a digital camera, mobile terminal, or the like provided with a contact detection unit. FIG. 1 is a block diagram schematically illustrating the structure of the electronic device according to an embodiment of the present invention. As illustrated in FIG. 1, an electronic device 1 is provided with a contact detection unit 10, a display unit 20, an imaging unit 30, a storage unit 40, a tactile sensation providing unit 50, and a control unit 60.

The imaging unit 30 is provided with a photography lens and photographs a subject. Furthermore, the imaging unit 30 is provided with a focus function to focus the lens on the subject and with a function to adjust the aperture of the lens.

The display unit 20 displays an image photographed by the imaging unit 30. The display unit 20 is, for example, configured using a liquid crystal display panel (LCD), an organic EL display panel, or the like.

The contact detection unit 10 is normally provided on the front face of the display unit 20 and detects, on an input face 10a of the contact detection unit 10 corresponding to an image displayed on the display screen of the display unit 20, contact or release of contact by a contacting object (pressing object), such as an operator's finger or the like, with the displayed image. The contact detection unit 10 detects the contact on the input face 10a and notifies the control unit 60. The contact detection unit 10 is configured using a well-known type, for example a resistive film type, a capacitive type, or the like. The contact detection unit 10 outputs a signal based on change in resistance due to contact by a contacting object to the control unit 60 in the case of a resistive film type and outputs a signal based on change in capacitance due to contact by a contacting object to the control unit 60 in the case of a capacitive type. Note that in order for the touch panel (or, the contact detection unit 10) to detect contact by a contacting object, it is not essential for the contacting object to physically contact the touch panel. For example, if the touch panel is an optical type, the touch panel detects the position at which an infrared ray over the touch panel is blocked by a contacting object, and therefore it is not necessary for the contacting object to contact the touch panel.

The control unit 60 begins predetermined processing based on contact with the contact detection unit 10 by a contacting object. The control unit 60 also calculates the contact area based on a signal that is based on change in resistance or a signal that is based on change in capacitance due to contact by the contacting object, the signal being output from the contact detection unit 10. The control unit 60 then increases or decreases a parameter based on the calculated contact area and on a standard area so as to control the imaging unit 30. The predetermined processing referred to in the present embodiment is photography processing (operation) described below, and a parameter associated with the predetermined processing is a parameter for adjusting the focal length during the photography processing. Hereinafter, in the present disclosure, "extending the focal length by increasing the parameter for adjusting the focal length" is abbreviated as "extending the focal length", and "shortening the focal length by decreasing the parameter for adjusting the focal length" is abbreviated as "shortening the focal length". Note that increasing or decreasing the parameter for adjusting the focal length may respectively be associated with either extending or shortening the focal length. In other words, the control unit 60 increasing the parameter to adjust the focal length may cause the focal length either to extend or to shorten.

The control unit 60 instructs the tactile sensation providing unit 50 to execute a tactile sensation providing operation when the contact area between the contact detection unit 10 and the contacting object is equal to or greater than a standard area. After instructing the tactile sensation providing unit 50 to execute a tactile sensation providing operation, the control unit 60 controls the imaging unit 30 to shorten the focal length if the contact area between the contact detection unit 10 and the contacting object is less than the standard area and to extend the focal length if the contact area is equal to or greater than the standard area.

The tactile sensation providing unit 50 is, for example, configured using a piezoelectric vibrator or the like and provides a predetermined tactile sensation to the contacting object in contact with the input face 10a by generating vibration or the like with a predetermined vibration pattern. The tactile sensation providing unit 50 may generate vibration in a "contact sensation" pattern, a "shallow press sensation" pattern, and a "deep press sensation" pattern. The "contact sensation" pattern is, for example, a vibration pattern with a constant amplitude. The "shallow press sensation" pattern is, for example, a vibration pattern in which the amplitude gradually decreases. The "deep press sensation" pattern is, for example, a vibration pattern in which the amplitude gradually increases.

The storage unit 40 may be configured using memory according to a known technique. In addition to storing a variety of input information, a program for causing the electronic device 1 to operate, and the like, the storage unit 40 also functions as a work area. In the present embodiment, the storage unit 40 stores the value of the standard area for the control unit 60 to judge the magnitude of the contact area between the contact detection unit 10 and the contacting object, as well as vibration data for the "contact sensation" pattern, the "shallow press sensation" pattern, and the "deep press sensation" pattern for when the tactile sensation providing unit 50 generates vibration.

Figure 2A:
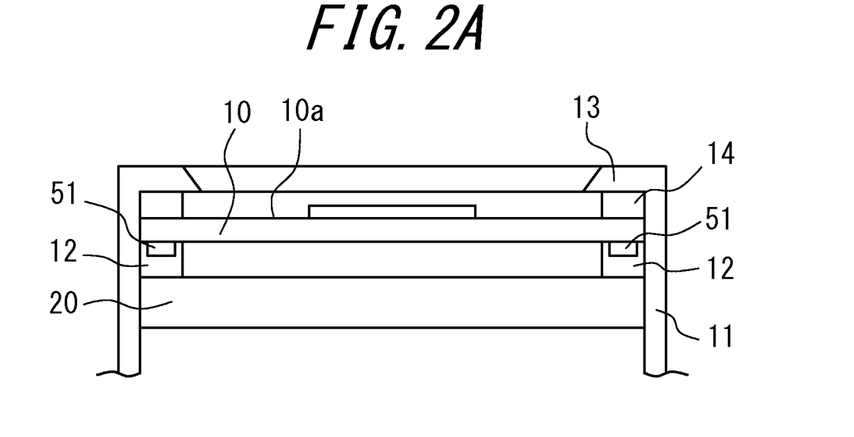
FIGS. 2A and 2B illustrate an exemplary housing structure of the electronic device according to an embodiment of the present invention.
Figure 2B:
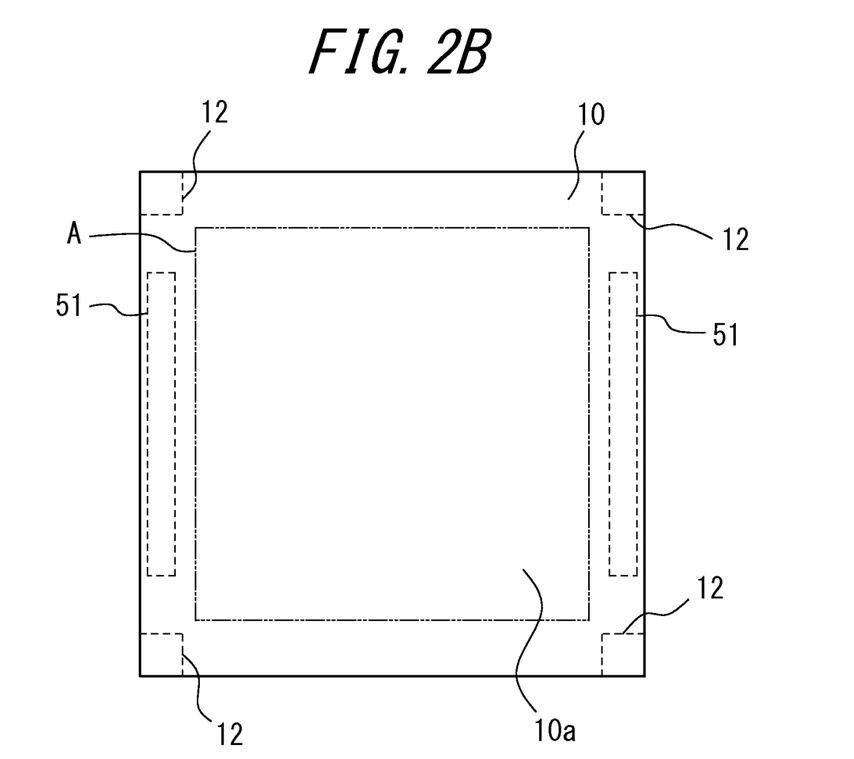

FIGS. 2A and 2B illustrate an exemplary housing structure of the electronic device 1 in FIG. 1. FIG. 2A is a cross-sectional diagram of certain portions, and FIG. 2B is a plan view of certain portions. The display unit 20 is held and stored within a housing 11. The contact detection unit 10 is held above the display unit 20 via an insulator 12 made from an elastic member. The electronic device 1 according to the present embodiment is rectangular in plan view of the display unit 20 and the contact detection unit 10. In the present embodiment, the contact detection unit 10 is held above the display unit 20 via four insulators 12 provided respectively at the four corners, away from a display region A of the display unit 20 illustrated in FIG. 2B by phantom lines.

In the housing 11, an upper cover 13 is provided so as to cover a surface region of the contact detection unit 10 away from the display region of the display unit 20. An insulator 14 made from an elastic member is provided between the upper cover 13 and the contact detection unit 10.

In the contact detection unit 10 illustrated in FIGS. 2A and 2B, a surface member including the input face 10a is, for example, configured using a transparent film or glass, and a back face member is configured using glass or acrylic.

On the back face of the contact detection unit 10, a piezoelectric vibrator 51 is provided, via adhesion or the like, near each of two opposing sides in order to vibrate the contact detection unit 10. In other words, in the electronic device 1 illustrated in FIGS. 2A and 2B, the tactile sensation providing unit 50 illustrated in FIG. 1 is configured using two piezoelectric vibrators 51. By vibrating the contact detection unit 10, the tactile sensation providing unit 50 vibrates the input face 10a. Note that the housing 11, upper cover 13, and insulator 14 illustrated in FIG. 2A are omitted from FIG. 2B.

Figure 3:
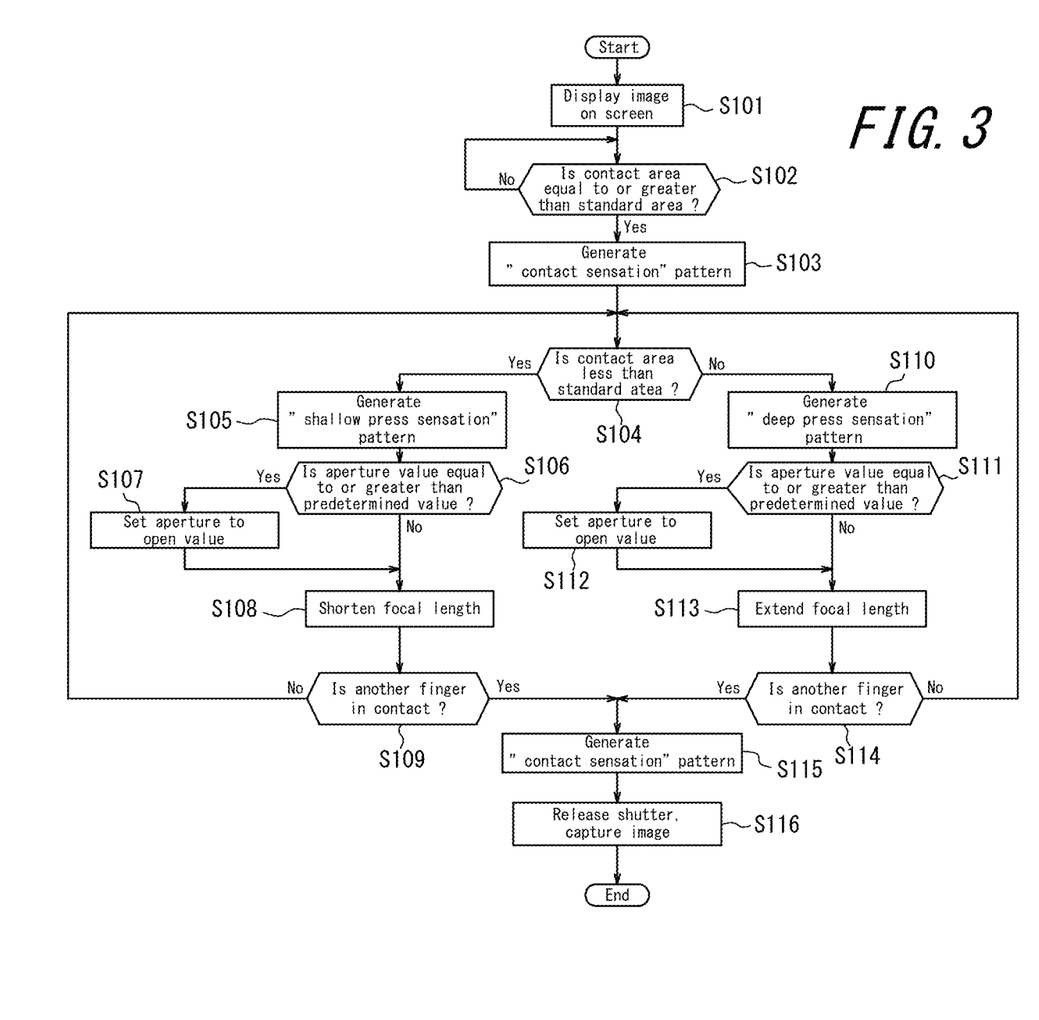
FIG. 3 is a flowchart illustrating operations of the electronic device according to an embodiment of the present invention.

Next, operations of the electronic device 1 according to the present embodiment with the above structure are described. FIG. 3 is a flowchart illustrating operations of the electronic device 1 according to the present embodiment.

First, when the electronic device 1 begins photography, the control unit 60 displays a photography image on the display unit 20 (step S101) and judges whether the contact area between the contact detection unit 10 and the contacting object, such as the operator's finger or the like, is equal to or greater than the standard area (step S102). In step S102, when the contact area between the contact detection unit 10 and the contacting object is equal to or greater than the standard area, the control unit 60 instructs the tactile sensation providing unit 50 to execute a tactile sensation providing operation with the "contact sensation" pattern (step S103). By causing the tactile sensation providing unit 50 to execute a tactile sensation providing operation with the "contact sensation" pattern, the control unit 60 can notify the operator that the start of operation has been received. The "contact sensation" pattern is, for example, a vibration pattern with a constant amplitude.

Subsequently, the control unit 60 judges whether the contact area between the contact detection unit 10 and the contacting object is less than the standard area (step S104). When the contact area is less than the standard area (step S104: Yes), the control unit 60 causes the tactile sensation providing unit 50 to execute a tactile sensation providing operation with the "shallow press sensation" pattern (step S105). The "shallow press sensation" pattern is, for example, a vibration pattern in which the amplitude gradually decreases. The control unit 60 then judges whether the lens aperture value (F value) of the imaging unit 30 is equal to or greater than a predetermined value (step S106). When the lens aperture is closed, as when the photography mode is scenery mode, and the aperture value (F value) is large, i.e. when the aperture value is equal to or greater than a predetermined value (step S106: Yes), the control unit 60 sets the lens aperture value to an open value (step S107) and subsequently instructs the imaging unit 30 to focus on the foreground (i.e. to shorten the focal length; step S108). When the aperture value is less than a predetermined value (step S106: No), then without changing the lens aperture value, the control unit 60 instructs the imaging unit 30 to focus on the foreground (i.e. to shorten the focal length; step S108). Subsequently, the control unit 60 monitors for contact on the contact detection unit 10 by another finger or the like other than the finger of the operator currently in contact (step S109), and when no contact by another finger of the operator or the like is detected (step S109: No), processing returns to step S104.

In step S104, when the contact area is equal to or greater than the standard area (step S104: No), the control unit 60 causes the tactile sensation providing unit 50 to execute a tactile sensation providing operation with the "deep press sensation" pattern (step S110). The "deep press sensation" pattern is, for example, a vibration pattern in which the amplitude gradually increases. The control unit 60 then judges whether the lens aperture value (F value) of the imaging unit 30 is equal to or greater than a predetermined value (step S111). When the lens aperture is closed, as when the photography mode is scenery mode, and the aperture value (F value) is large, i.e. when the aperture value is equal to or greater than a predetermined value (step S111: Yes), the control unit 60 sets the lens aperture value to an open value (step S112) and subsequently instructs the imaging unit 30 to focus on the background (i.e. to extend the focal length; step S113). When the aperture value is less than a predetermined value (step S111: No), then without changing the lens aperture value, the control unit 60 instructs the imaging unit 30 to focus on the background (i.e. to extend the focal length; step S113). Subsequently, the control unit 60 monitors for contact on the contact detection unit 10 by another finger or the like other than the finger of the operator currently in contact (step S114), and when no contact by another finger of the operator or the like is detected (step S114: No), processing returns to step S104.

In step S109 and step S114, when contact by another finger of the operator or the like is detected, the control unit 60 causes the tactile sensation providing unit 50 to execute a tactile sensation providing operation with the "contact sensation" pattern (step S115) and instructs the imaging unit 30 to fix the focal length and the aperture value, release the shutter, and capture an image (step S116).

Figure 4A:
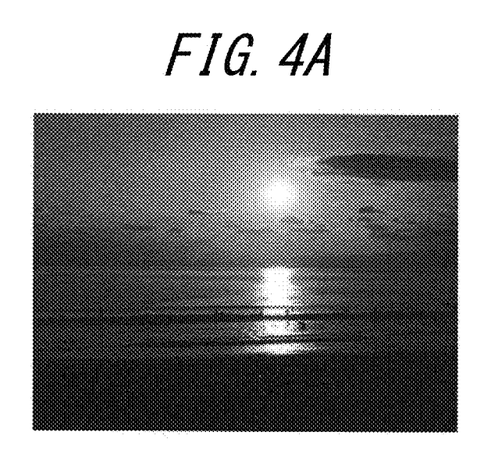
FIGS. 4A and 4B illustrate an example of photography images when strong light is present in the photography frame.
Figure 4B:
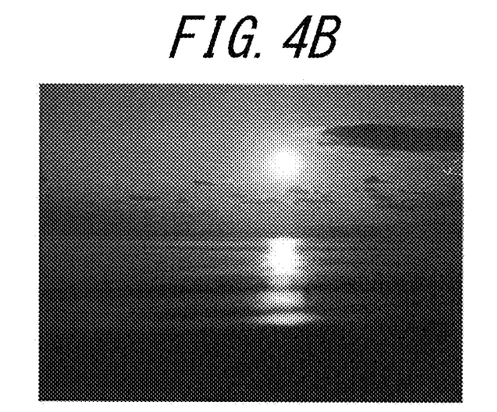

Next, examples are provided of photography images captured by photography by an electronic device according to the present embodiment. FIGS. 4A and 4B illustrate an example of photography images when strong light is present in the photography frame, such as when photographing the sunset or sunrise. When strong light is present in the photography frame and a photograph is taken in normal scenery mode, everything is in focus from the foreground to the background, as illustrated in FIG. 4A. With the electronic device according to the present embodiment, however, while the electronic device is in scenery mode, the photographer (operator) can open the aperture automatically (i.e. set the aperture value to an open value) and adjust the focus to a desired position while viewing the photography screen by contacting the screen with a finger and increasing or decreasing the contact area of the finger. FIG. 4B illustrates an image photographed by the electronic device according to the present embodiment by setting the aperture to an open value (small F value) and focusing on the background.

Figure 5A:
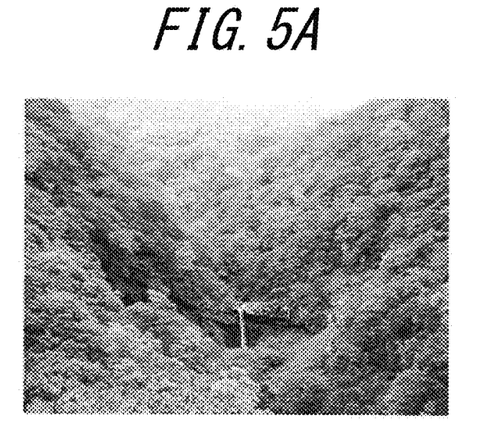
FIGS. 5A and 5B illustrate an example of photography images of monotonous scenery having depth.
Figure 5B:
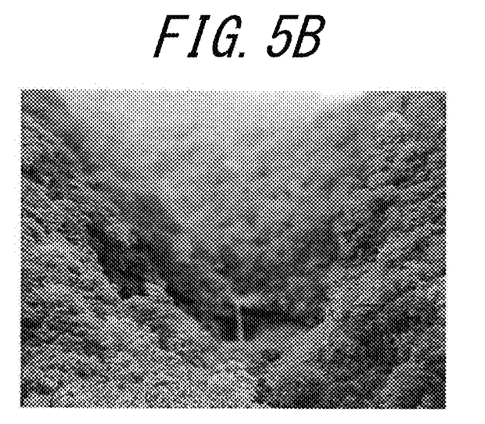

FIGS. 5A and 5B illustrate an example of photography images of monotonous scenery having depth, such as a mountainside, when photographing autumn foliage or the like. When monotonous scenery having depth, such as autumn foliage in the mountains, is photographed in normal scenery mode, everything is in focus from the foreground to the background, as illustrated in FIG. 5A. With the electronic device according to the present embodiment, however, while the electronic device is in scenery mode, the photographer may open the aperture automatically (i.e. set the aperture value to an open value) and adjust the focus to a desired position while viewing the photography screen by contacting the screen with a finger and increasing or decreasing the contact area of the finger. FIG. 5B illustrates an image photographed by the electronic device according to the present embodiment by setting the aperture to an open value (small F value) and focusing on the foreground.

Figure 6A:
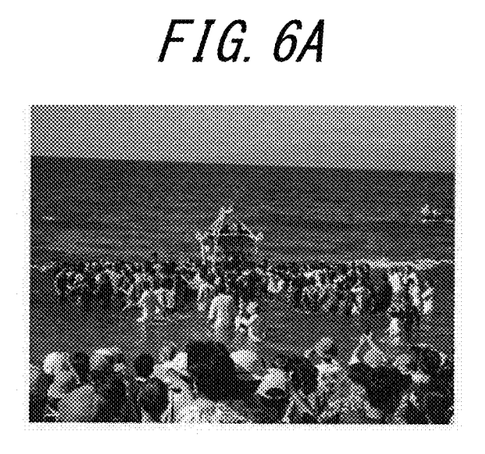
FIGS. 6A and 6B illustrate an example of photography images when taking a photograph in a crowd.
Figure 6B:
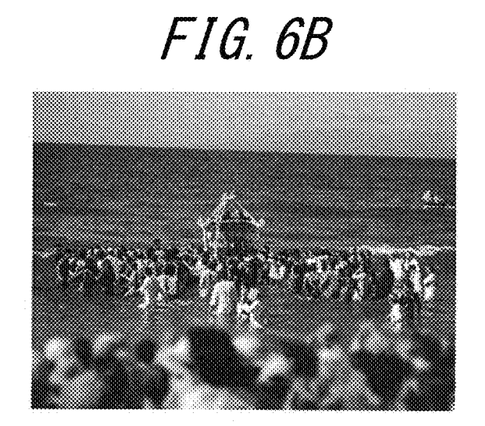

FIGS. 6A and 6B illustrate an example of photography images when taking a photograph in a crowd, such as at a tourist attraction. When photographing a desired target among a crowd, such as at a tourist attraction, in normal scenery mode, everything is in focus from the foreground to the background, as illustrated in FIG. 6A. With the electronic device according to the present embodiment, however, while the electronic device is in scenery mode, the photographer may open the aperture automatically (i.e. set the aperture value to an open value) and adjust the degree of distortion at the front of the crowd while viewing the photography screen by contacting the screen with a finger and increasing or decreasing the contact area of the finger. FIG. 6B illustrates an image photographed by the electronic device according to the present embodiment by focusing on the background and distorting the front of the crowd.

Figure 7A:
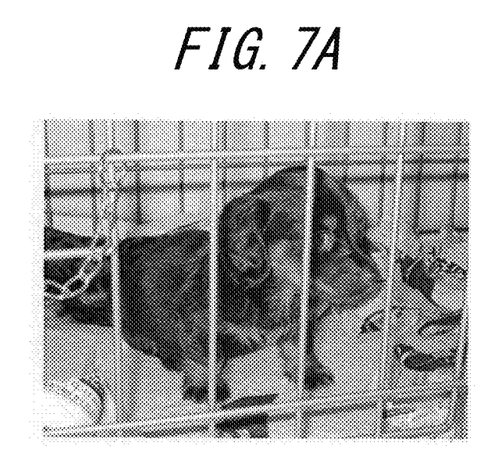
FIGS. 7A and 7B illustrate an example of photography images when taking a photograph of an animal or the like in a cage.
Figure 7B:
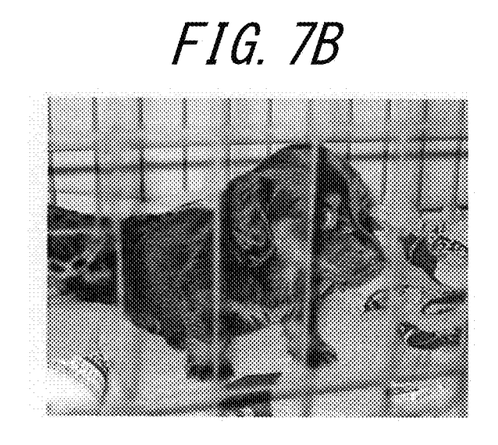

FIGS. 7A and 7B illustrate an example of photography images when taking a photograph of an animal or the like in a cage. When photographing an animal in a cage at the zoo or at home, the front of the cage is focused on with autofocus, as illustrated in FIG. 7A. In order for the cage not to show, the photographer either needs to get near the cage or change the aperture to a nearly open setting. With the electronic device according to the present embodiment, the photographer may simply open the aperture automatically (i.e. set the aperture value to an open value) and adjust the degree of distortion of the cage while viewing the photography screen by contacting the screen with a finger and increasing or decreasing the contact area of the finger, without changing the photography distance. FIG. 7B illustrates an image photographed by the electronic device according to the present embodiment by focusing on the animal in the cage and distorting the front of the cage.

Figure 8A:
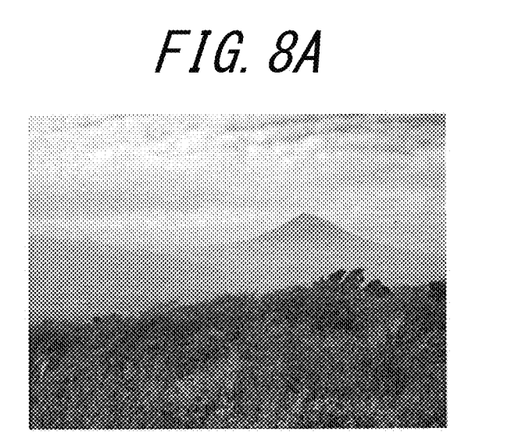
FIGS. 8A and 8B illustrate an example of photography screens when photographing scenery while still in person mode.
Figure 8B:
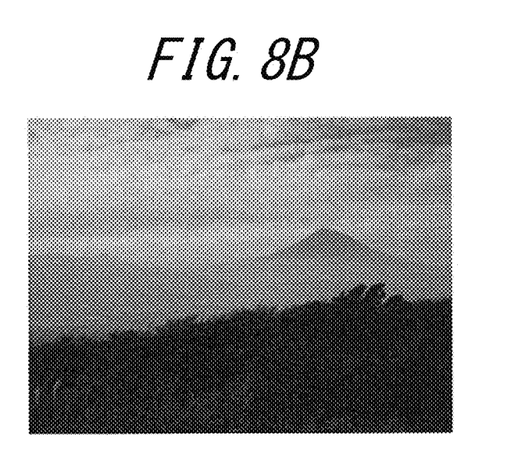

FIGS. 8A and 8B illustrate an example of photography screens when photographing scenery while still in person mode. Photographing scenery while the photography mode of the camera is left in person mode may, depending on the position of the focus lock, cause the foreground to be in greater focus than the background, as illustrated in FIG. 8A. With the electronic device according to the present embodiment, the photographer may, without changing the photography mode, switch to manual focus by contacting the screen with a finger and take a picture after focusing on a desired location while viewing the photography screen by increasing or decreasing the contact area of the finger. FIG. 8B illustrates an image photographed by the electronic device according to the present embodiment by adjusting the position of focus so as to focus on the background.

As described above, since the electronic device according to the present embodiment calculates the contact area between the contact detection unit and the contacting object, and increases or decreases a parameter based on the calculated contact area and the standard area, it is not necessary to provide a button or the like for increasing or decreasing the parameter. Furthermore, since the electronic device according to the present embodiment calculates the contact area between the contact detection unit and the contacting object and increases or decreases a parameter based on the calculated contact area and the standard area, the operator may increase or decrease the parameter intuitively and smoothly.

Note that in the above-described embodiment, the contact area between the contact detection unit and the contacting object is calculated, and based on the calculated contact area and the standard area, the focal length is adjusted by being extended or shortened, yet in addition to adjustment by extending or shortening the focal length, the present invention may also be adopted for increasing or decreasing a parameter associated with predetermined processing, for example expanding or contracting the display screen. In greater detail, the predetermined processing may be display processing, and the present invention may be adopted in processing to expand or contract a displayed image associated with display processing by increasing or decreasing a parameter for expanding or contracting the image. The predetermined processing may also be music playback processing, and the present invention may be adopted in processing to raise or lower the volume associated with the music playback processing by increasing or decreasing a parameter for raising or lowering the volume. The predetermined processing may also be video playback processing, and the present invention may be adopted in processing to fast forward or rewind the video associated with the video playback processing by increasing or decreasing a parameter for fast forwarding or rewinding the video. In this way, by increasing or decreasing a parameter associated with predetermined processing, the present invention may be used during the predetermined processing to adjust the size, order, or the like of an item associated with the parameter.

In the above-described embodiment, the control unit 60 controls the imaging unit 30 to shorten the focal length when the contact area between the contact detection unit 10 and the contacting object is less than the standard area and to extend the focal length when the contact area between the contact detection unit 10 and the contacting object is equal to or greater than the standard area, yet the control unit 60 may control the imaging unit 30 to extend the focal length when the contact area between the contact detection unit 10 and the contacting object is less than the standard area and to shorten the focal length when the contact area between the contact detection unit 10 and the contacting object is equal to or greater than the standard area.

The tactile sensation providing unit 50 may be configured to vibrate the input face 10a of the contact detection unit 10 indirectly by vibrating the electronic device 1 based on a vibration motor (eccentric motor).

In the above-described embodiment, it is assumed that the contact detection unit 10 is overlaid on the upper face of the display unit 20, yet the present invention is not necessarily limited to this configuration, and a configuration may be adopted in which the contact detection unit 10 and the display unit 20 are separated.

In the above-described embodiment, the meaning of expressions such as "equal to or greater" than the standard area and "less than" the standard area is not necessarily precise. "Equal to or greater" than the standard area may include the case of exceeding the standard area, and "less than" the standard area may include the case of being equal to or less than the standard area.

In the above-described embodiment, for the tactile sensation providing unit 50 to provide a tactile sensation to the contacting object in contact with the input face 10a, an example is described of the tactile sensation providing unit 50 providing a tactile sensation to the contacting object in contact with the input face 10a by generating a vibration in the input face 10a, yet the present invention is not limited to this example. A tactile sensation may be provided to the contacting object in contact with the input face 10a without using mechanical vibration, for example by controlling the charge of a film attached to the contact detection unit 10.

In the above-described embodiment, the value of the standard area is stored in the storage unit 60, yet the operator may be allowed to change the value of the standard area as necessary. Furthermore, when the contact area between the contact detection unit and the contacting object calculated by the control unit is within a predetermined time and predetermined amount of change, the value of the standard area may be set based on the contact area calculated within the predetermined time. For example, the standard area that is set may be the average contact area during the above-described predetermined time, the contact area at the initial point in time during the predetermined time, or the contact area at the final point in time during the predetermined time.

In the above-described embodiment, the control unit controls the imaging unit to extend the focal length when the contact area is equal to or greater than the standard area and to shorten the focal length when the contact area is less than the standard area, yet the control unit may extend or shorten the focal length in accordance with the difference between the contact area and the standard area. In other words, the control unit may determine a distance that extends or shortens the focal length in accordance with the difference between the contact area and the standard area. When the contact area is equal to or greater than the standard area, the control unit may continue to extend the focal length, and when the contact area is less than the standard area, the control unit may continue to shorten the focal length. The control unit may also determine the speed for continuing to extend or shorten the focal length in accordance with the difference between the contact area and the standard area. In other words, when the difference between the contact area and the standard area is large, the control unit may increase the speed for continuing to extend or shorten the focal length as compared to when the difference between the contact area and the standard area is small.

The standard area may be continually updated based on the contact area between the contact detection unit and the contacting object calculated by the control unit. In other words, the standard area at a certain point in time may be set to the contact area between the contact detection unit and the contacting object at an immediately previous point in time. By setting the standard area in this way, the control unit can control the focal length to extend as the contact area between the contact detection unit and the contacting object increases and can control the focal length to shorten as the contact area between the contact detection unit and the contacting object decreases.

REFERENCE SIGNS LIST

1: Electronic device
10: Contact detection unit
10a: Input face
11: Housing
12: Insulator
13: Upper cover
14: Insulator
20: Display unit
30: Imaging unit
40: Storage unit
50: Tactile sensation providing unit
51: Piezoelectric vibrator
60: Control unit

The invention claimed is:
1. An electronic device comprising:
a contact detection unit configured to detect contact by a contacting object;
an imagining unit configured to image a subject;
a tactile sensation providing unit configured to provide a tactile sensation to the contacting object in contact with the contact detection unit; and
a control unit configured to control the imaging unit to adjust a focal length with respect to the subject based on an amount of contact area between the contact detection unit and the contacting object, wherein
the control unit, by adjusting the parameter corresponding to the amount of the contact area, controls the imaging unit to adjust the focal length, and wherein
the control unit controls the tactile sensation providing unit to provide the tactile sensation to the contacting object when the contact area between the contact detection unit and the contacting object is equal to or greater than the standard area, and
after controlling the tactile sensation providing unit to provide the tactile sensation to the contacting object, shortens the focal length when the contact area between the contact detection unit and the contacting object is less than the standard area and extends the focal length when the contact area between the contact detection unit and the contacting object is equal to or greater than the standard area.

* * * * *